(12) United States Patent
Frederick et al.

(10) Patent No.: US 7,034,305 B2
(45) Date of Patent: Apr. 25, 2006

(54) INSTRUMENTATION PACKAGE AND INTEGRATED RADIATION DETECTOR

(75) Inventors: Larry D. Frederick, Huntsville, AL (US); Dwight Medley, Kelso, TN (US); Frederick L. Glesius, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 160 days.

(21) Appl. No.: 10/394,656

(22) Filed: Mar. 24, 2003

(65) Prior Publication Data

US 2003/0209671 A1    Nov. 13, 2003

Related U.S. Application Data

(60) Provisional application No. 60/411,788, filed on Sep. 19, 2002, provisional application No. 60/366,265, filed on Mar. 22, 2002.

(51) Int. Cl.
*G01T 1/20* (2006.01)

(52) U.S. Cl. .......................... 250/361 R; 250/363.01; 250/368

(58) Field of Classification Search ............ 250/361 R, 250/363.01, 368
See application file for complete search history.

(56) References Cited

U.S. PATENT DOCUMENTS

| | | | |
|---|---|---|---|
| 2,902,603 A | 9/1959 | Ferre | |
| 2,945,955 A | 7/1960 | Mossop et al. | |
| 2,949,534 A | 8/1960 | Youmans | |
| 3,049,620 A | 8/1962 | George et al. | |
| 3,068,359 A | 12/1962 | Carlson | |
| 3,073,954 A | 1/1963 | Carlson et al. | |
| 3,265,893 A | 8/1966 | Rabson et al. | |
| 3,930,160 A | 12/1975 | Swinehart | |
| 4,004,151 A | 1/1977 | Novak | |
| 4,158,773 A | 6/1979 | Novak | |
| 4,200,335 A | 4/1980 | Moynihan et al. | |
| 4,262,964 A | 4/1981 | Ingle et al. | |
| 4,360,733 A | 11/1982 | Novak et al. | |
| 4,383,175 A | 5/1983 | Toepke | |
| 4,649,276 A | 3/1987 | Suzuki et al. | |
| 4,666,251 A | 5/1987 | Liberman et al. | |
| 4,676,817 A | 6/1987 | Tailor et al. | |
| 4,764,677 A | 8/1988 | Spurney | |
| 4,833,320 A | 5/1989 | Hurlbut | |
| 4,879,463 A | 11/1989 | Wraight et al. | |
| 4,900,937 A | 2/1990 | Dayton | |
| 4,904,865 A | 2/1990 | Meisner et al. | |
| 4,981,327 A | 1/1991 | Bessinger et al. | |
| 4,994,673 A | 2/1991 | Perna et al. | |
| 5,005,422 A | 4/1991 | Ruscev et al. | |
| 5,015,860 A | 5/1991 | Moses | |

(Continued)

*Primary Examiner*—David Porta
*Assistant Examiner*—Shun Lee
(74) *Attorney, Agent, or Firm*—Nixon & Vanderhye, P.C.

(57) ABSTRACT

An instrumentation package in broad terms includes at least one substantially cylindrical instrumentation component; a substantially cylindrical shield surrounding the instrumentation component, the shield having a diameter less than a standard predetermined diameter; and a sizing sleeve around the shield, thereby increasing the diameter of the sleeve to the standard predetermined diameter. A nuclear detector package is also disclosed that includes a substantially cylindrical crystal element; a photomultiplier tube arranged coaxially with the crystal element; an optical coupler sandwiched between one end of the crystal element and an adjacent end of the photomultiplier tube; the crystal element, optical coupler and photomultiplier tube hermetically sealed within a cylindrical shield; and a flexible support sleeve extending exteriorly along the crystal element and the photomultiplier tube and radially inside the cylindrical shield.

28 Claims, 7 Drawing Sheets

U.S. PATENT DOCUMENTS

| | | |
|---|---|---|
| 5,015,861 A | 5/1991 | Derenzo et al. |
| 5,030,830 A | 7/1991 | Okada |
| 5,046,854 A | 9/1991 | Weller et al. |
| 5,047,635 A | 9/1991 | Leaney et al. |
| 5,061,849 A | 10/1991 | Meisner et al. |
| 5,070,249 A | 12/1991 | White |
| 5,087,818 A | 2/1992 | Bellian et al. |
| 5,120,963 A | 6/1992 | Robinson et al. |
| 5,264,154 A | 11/1993 | Akiyama et al. |
| 5,283,439 A | 2/1994 | Bouissou et al. |
| 5,317,158 A | 5/1994 | McElhaney et al. |
| 5,332,906 A | 7/1994 | Lauf et al. |
| 5,334,838 A | 8/1994 | Ramsden, Jr. |
| 5,338,937 A | 8/1994 | Daghighian et al. |
| 5,397,893 A | 3/1995 | Minette |
| 5,408,097 A | 4/1995 | Wraight et al. |
| 5,548,116 A | 8/1996 | Pandelisev |
| 5,632,469 A | 5/1997 | Heun et al. |
| 5,742,057 A | 4/1998 | Frederick et al. |
| 5,753,919 A | 5/1998 | Prain et al. |
| 5,769,503 A | 6/1998 | Stolarczyk et al. |
| 5,796,109 A | 8/1998 | Frederick et al. |
| 5,962,855 A | 10/1999 | Frederick et al. |
| 6,222,192 B1 | 4/2001 | Sekela et al. |
| 6,355,932 B1 | 3/2002 | Frederick |
| 6,359,282 B1 | 3/2002 | Sekela |
| 6,465,788 B1 | 10/2002 | Medley |
| 2002/0166973 A1 | 11/2002 | Frederick et al. |

INSTRUMENTATION PACKAGE AND INTEGRATED RADIATION DETECTOR

This application claims the benefit of Provisional Application No. 60/411,788, filed Sep. 19, 2002 and Provisional Application No. 60/366,265, filed Mar. 22, 2002, the entire content of which is hereby incorporated by reference in this application.

BACKGROUND OF THE INVENTION

This invention relates to a low cost, high performance instrumentation package particularly applicable, but not limited to radiation detectors used in solid mineral mining or oil well logging operations (referred to in the industry as wireline operations), and to a highly integrated electro-optical radiation detector for Measurement While Drilling (MWD) or Logging While Drilling (LWD) operations in which the shock and vibration levels are more extreme.

Scintillation packages typically include a scintillation or crystal element (or simply, crystal) supported within a cylindrical shield. A consequence of making scintillation packages sufficiently rugged for reliable use in harsh environments, such as coal mining or oil well logging, has been some reduction in performance. Making scintillation packages rugged has also increased the cost of fabrication. Although significant progress has been made in recent years in the development and deployment of scintillation packages which are able to withstand temperatures of up to about 200° C. and to simultaneously withstand shock and vibration, there remains a need to further improve functional performance and reduce cost without compromising reliability while operating in harsh environments.

Several factors contribute to reduced performance of scintillation packages. Thicker glass windows are sometimes used in order to withstand the thermal and shock loads and to ensure a good hermetic seal. Thicker couplers are sometimes used in order to provide cushioning between the scintillation element and the window and to provide more compliance so that the scintillation element will be less likely to separate from the coupler under vibration. These thicker elements in the optical path result in loss of light and reduce the field of view of the photomultiplier that is receiving the light from the package.

Compressive forces around a scintillation element are necessary in order to minimize movement of the element under vibration and shock since such motion will result in unwanted noise being generated in the optical output. Such compressive forces, when applied to some reflector materials around the scintillation element cause the material to become less reflective and may cause the material to partially "wet" the surface of the scintillation element. An example of a highly effective reflector material is a special TEFLON® tape, which is porous. This is one of the most effective reflectors of scintillation-produced light in the near UV range and it has been widely used for reflectors on scintillation packages for decades. This material is very pliable, however, and if pressed against the surface of a scintillation element, the efficiency of this tape, as a reflector, diminishes. Yet, a scintillation element must be held firmly in order to be used in harsh environments in order to not break and in order to not produce spontaneous scintillations. Various elastomeric materials—pottings, boots, powders and metallic elements—have been used to support scintillation elements. Each material has its own advantages and disadvantages and may be chosen accordingly. However, all known methods of support within scintillation packages using Teflon® tape and certain other reflectors, which have proven to be effective to protect the scintillation element from thermal effects and high temperature, result in compression of the tape, causing loss in performance. For example, a boot placed around the reflector must be installed in a compressed state in order to prevent movement of the element at ambient temperatures. At elevated temperatures, the scintillation element expands and increases the compressive force. The boot material, typically made from an elastomeric material, also expands to further increase the pressure on the reflector. Using properly designed metallic supporting elements improves this loading problem by limiting maximum pressure on the tape.

In a similar manner, use of porous reflective tape at the rear of the scintillation element may also be affected by the constant pressure of the rear spring.

Use of relatively thick stainless steel housings, or shields, around the scintillation element has increased attenuation of gamma radiation as it passes into the package.

Similarly, several factors contribute to increased cost of ruggedized scintillation packages. This is particularly true for designs that are directed toward minimizing the performance weaknesses described above. Replacement of thick glass windows with thinner sapphire windows is more costly because sapphire is more costly than glass and can be significantly more costly if processed in only small quantities. Use of titanium reduces attenuation below that of stainless steel, while maintaining high strength, and, for the same strength, can be thinner than aluminum. But use of titanium for shields is more costly than stainless steel. Not only is titanium metal more expensive, titanium pipe sizes and tubing sizes that are readily available in the industry for use in manufacturing shields increase the work required to perform the machining of the shields to the required tolerances. Given all the variables, making special mill runs of extruded titanium pipe in order to minimize machining costs is not commercially acceptable in most cases. Therefore, there is a need for a design approach that addresses both technical and commercial considerations.

Another factor that constrains cost cutting is that there has been a degree of standardization in the industry that places specific requirements on the external and internal dimensions of many of the commonly used configurations. These factors and others, when taken together, result in overall higher costs while providing less than optimum functional performance.

Similarly, with regard to complete detector assemblies such as radiation detectors (typically including a scintillation package coupled by a window and/or optical coupler to a photomultiplier tube or PMT), used in mining operations (both oil well drilling and solid mineral mining), and in oil well MWD and LWD operations, is that the detector be able to survive harsh environments such as high vibration and shock. For much of the history of using nuclear radiation (e.g., gamma ray) detectors for mining applications, the critical elements inside the detectors as well as the complete detectors inside a tool housing, have been supported with elastomeric materials, sometimes in combination with longitudinally placed springs. Such relatively soft elastomeric materials are often still used to provide cushioning or dynamic isolation from shock and vibration. In recent years, the technology has advanced to the use of metallic support devices which are effective and use less space. Metallic supports are described in, for example, U.S. Pat. Nos. 5,742,057; 5,796,109; 5,962,855; and 6,355,932.

As already mentioned, one element commonly found in a nuclear detector, particularly when a hygroscopic scintillation crystal is used, is a window arranged between the scintillation crystal and the PMT or other device that converts the scintillations to electrical pulses. This window is utilized because the hygroscopic crystal must be encased in a hermetically sealed enclosure, and the window allows the scintillation pulses to pass from the enclosure to the PMT. Thick glass windows are typically used in scintillation packages for use in downhole applications in order to provide needed strength and in order to provide a good hermetic seal.

In an attempt to improve detector performance, configurations have been devised for eliminating the window by placing the PMT inside a hermetically sealed housing with the crystal. An immediate advantage is that the light can pass directly from the scintillation crystal, through a thin optical coupler, into the PMT, without having to pass through the window and an additional optical coupling. Without the additional two elements in the light path, less light is lost and the amount of light from each scintillation pulse is brighter, thus increasing the gain of the detector. This increased gain, in turn has the particularly important benefit of maintaining the overall gain of the detector above a minimum level as the gain of the PMT drops due to degradation of its photocathode over time at high temperature. The pulse height resolution can also be improved by deletion of the crystal window and also the space that would have been used by the window can then be used to add more crystal. However, most previous designs that place the PMT and crystal into a single hermetic housing cannot survive in a harsh environment, such as in mining operations, and particularly in MWD and LWD operations.

Another attempt to satisfy current needs has been to place both a PMT and crystal inside a hermetically sealed housing, and then to dynamically support the PMT and crystal with an elastomeric material. This arrangement is described in U.S. Pat. No. 6,222,192. Due to the well understood need to prevent bending of the PMT/crystal, an elastomeric cylindrical sleeve is installed around the PMT/Crystal so as to rigidize the PMT/Crystal assembly. This arrangement creates additional problems, however, and has not proven to be fully satisfactory for reasons that will be better understood later.

In addition to considerations related to the internal construction of a radiation detector, it is common practice to also use elastomeric materials externally of the detector, i.e., to support the detector in the tool cavity or housing into which it must be installed. Again, elastomers take up valuable space and do not provide the high damping properties that are desired for dynamic isolation from induced vibrations. Moreover, the elastomeric support will tend to have a low resonant frequency that, when combined with the relatively low damping, will produce a relatively high response thus amplifying the vibrations induced into the detector. These amplified vibrations increase the chance of producing noise in the detector output, or of even breaking the crystal or its interface to the PMT. Elastomeric material is incapable of providing support that exhibits the properties of a hard mount during normal or expected vibration levels. Thus, there is a need for a more effective and space efficient means of supporting the improved nuclear detector within the tool in which it is to be used.

A need also remains for a reliable, compact, high performance detector that can operate for longer periods of time at high temperatures, up to 175 Deg. C. or higher while under high vibration and shock conditions.

BRIEF DESCRIPTION OF THE INVENTION

This invention seeks to provide enhanced designs for instrumentation packages, and especially scintillation detector or neutron detector (e.g., an He3 proportional counter) packages for nuclear radiation detectors mounted in well logging tools, solid mineral mining or other harsh environments.

In one exemplary embodiment of a scintillation detector package, a flexible support sleeve (preferably metal) having a polygon shape in cross-section is placed around the scintillation or crystal element for supporting the crystal within a surrounding shield in such a way that much of the reflector material (e.g., reflector tape) wrapped about the crystal will not be compressed, thus improving performance. Since the metallic sleeve is a more effective dynamic support than an elastomeric material, it does not have to be in contact with the entire scintillation surface. The maximum force which occurs at the highest temperature will be less for a metallic support sleeve than for elastomeric materials. Thus, the support provided by narrow contact strip portions of the flexible metal sleeve (established by the polygon shape of the sleeve) along the scintillation element is reduced, plus the areas of the reflective material between these strip portions remains in an uncompressed state. Also, because the flexible support sleeve may be shorter in length than the crystal, special, simple sleeves combined with an internal step on the shield may be employed to restrain the flexible support sleeve axially within the shield such that the reflector tape will not be compressed in those areas that extend beyond the support sleeves. In another embodiment, a radial spacer around the scintillation element, in combination with the flexible sleeve, optimizes performance of the reflector material.

A flexible metal support sleeve is also inexpensive to manufacture, simple to install reliable, and provides excellent protection from thermal effects, shock and vibration.

Sapphire windows and thin optical couplers are preferred in that they improve transmission of scintillations from the package to the PMT. Sapphire windows are quite strong and can be made hermetic even when much thinner than can be reliably achieved for typical seals between glass and stainless steel. Use of a flexible metal sleeve provides predictable, axial restraint of the scintillation element so that the effects of shock and vibration in the axial direction will not produce excessive forces on the coupler or the window, and will normally not result in the crystal bouncing off the coupler, even when the coupler is made thinner than usual.

A titanium shield can be effectively brazed to a sapphire window. However, the tolerances and configuration of the area where the brazing is performed must be precise to allow a good hermetic seal. Titanium pipe in standard sizes is expensive and usually requires much machining to obtain the necessary dimensions. Welded titanium tubing that is appropriately sized for making shields tends to not be round. If standard size tubing is used to produce shields, by the time it is machined to a round sleeve, the diameter is too small to fit properly into tool cavities that are typically standardized to increments of ⅛ inch in diameter. A solution is to make shields slightly smaller than is required for standard applications, but then to bond a metal wrap to the surface of the package. Low cost metal tape is a suitable wrap material having acrylic adhesive that is adequate for temperatures up to 150° C. Titanium foil in thickness between 0.001" and 0.005" could also be bonded to the shield with readily available high temperature adhesives or bonding agents. A more effective solution is to install a metallic flexible sleeve around the detector which provides sizing, compliance with mesh interfaces, compliance with differential therein, expansion and shock isolation. This is particularly applicable in cases where there is a need to have the detector supported inside the tool cavity in a hard mounted configuration. The "hard mount" refers to supporting the crystal with a flexible sleeve such that the friction created by the sleeve prevents it from moving relative to the tool cavity during expected levels of vibration. An added advantage of the flexible sleeve is that it will release to provide damped isolation for high shock.

Once the shields are machined to a standard diameter, smaller than typical, special bands (tooling fixture) may be installed for final machining so that the brazing surface can be made round to the required precision, while the shield is being held round by the bands. At the time of brazing the sapphire window onto a titanium shield, another band is installed to bring the thin shield, including the surface to be brazed to the sapphire, back to a round condition. This approach eliminates the need for machining a fine finish onto the outer surface of the shield. It also allows use of a precision reamer to finish the brazing surface. Use of the flexible support sleeve between the shield and the crystal also eliminates the need for the normally rough-finished inner surface of the shield to be machined smooth because the flexible metal sleeve can be forced into place even with the higher friction of the inside of the shield, and/or eliminates the need for an additional installation sleeve.

Another cost factor relates to the quantities produced. Worldwide, there are possibly less than 10,000 new scintillation packages produced for rugged oil well drilling operations each year. Though these devices represent an enormous economic benefit, when the many required configurations are considered, the number required of any given size is too small to allow production on a large scale. In those instances where stainless steel shields may be precision fitted to achieve a hard mounted configuration, the hard mounted result can be achieved by using a flexible sleeve such that the stainless steel shield can be made a "standard size" with much looser tolerances that are less expensive to manufacture.

It becomes impractical to order mill runs of titanium, and even with the mill run production of optimum tubing dimensions, some undesirable costs remain. Due to many factors, technical and historical, it is very difficult to force standardization in such a way as to significantly increase the quantities of any given configuration. At the same time, the standardization that has occurred has hampered alternate configurations even when there is a legitimate reason for such configurations. For example, space may be too limited to install a crystal of a desired standard size because a standard package is too small. To design a smaller package results in an overall reduced level of standardization and higher cost. To increase standardization such that it will reduce cost while, at the same time, allow variations when needed, requires making a standard design adaptable to be able to fit other designs.

By using thin windows and thin couplers, and by using the combined effect of the axial restraint of the flexible sleeve with a shorter spring, the length of a scintillation package can be made smaller to allow a given crystal package to fit into a smaller space in the machine or tool in which it is to be used. Then, by using an end cap (or end cap adapter) on the rear that is adjustable in length, the same crystal package can be extended to fit snugly into a longer cavity in a detector, machine or tool. Therefore, the shortened shield can be used for any length of package, including package lengths that are somewhat shorter than would be considered standard and readily available. As a result, larger batches of shields can be processed to a single configuration, relying upon a simple end cap adapter to modify the length of the finished product. These shields can be processed through sapphire brazing in larger batches as well. A smaller than standard diameter shield is proposed as a way to ultimately reduce cost. It is also a way to allow small adjustments to the diameter of the package by applying metallic tape or foil of various selected thickness. Since such tape is readily available in different thicknesses, the finished diameter of the shield can be cheaply and quickly adjusted to match the requirement.

The above concepts may be extended to the entire detector assembly, i.e., to the combination of the scintillation package with a photomultiplier tube.

As explained above, there is a need for a more space efficient method for supporting a complete PMT/crystal assembly, hermetically sealed within a single tube or shield and to make the PMT/crystal operable for longer times at elevated temperatures. This can be accomplished by the further use of a thin flexible support sleeve, of polygon-shaped cross section in the exemplary embodiment, which is placed around the entire PMT/crystal assembly. The PMT/crystal, along with the flexible sleeve, are hermetically sealed within a tube or shield that also extends the full length of the PMT/crystal assembly.

In addition to providing mechanical support, such that the PMT and crystal can be directly coupled with no window between them, the flexible metal support sleeve provides for highly damped, dynamic isolation from externally induced vibrations and shock in the radial direction.

Dynamic support in the longitudinal direction consists of axial spring means at each end of the PMT/crystal sub assembly, in combination with the flexible metal support sleeve that extends over both components. The flexible metal sleeve provides for a high resonant frequency in the longitudinal direction, which prevents dynamic coupling with the high level, lower frequency, induced vibrations. As will be made clearer in detailed descriptions to follow, the flexible sleeve restrains the PMT/crystal assembly in the longitudinal direction through contact friction. Under high shock conditions, the PMT/crystal will slide within or relative to the flexible sleeve. When this happens, the sliding friction produces a high level of damping which prevents the support from amplifying the induced vibration. Also, by properly sizing a flexible sleeve, the PMT/crystal assembly can be held essentially rigid during most induced vibration but released under shock or high vibration to provide dynamic isolation where needed most.

Provisions are also made for the scintillation element or crystal to expand, due to temperature increases, in both the radial and longitudinal directions. In one embodiment, a reflector/support assembly that lies between the crystal and the flexible sleeve comprises reflective tape and a sidewall axial restraint and compliance Assembly (SARCA), as will be detailed later. Another embodiment uses reflective support rings around the crystal with reflective materials between. These reflective rings then carry the loads between the scintillation element and the flexible sleeve. In another embodiment, an oil ringed optical coupling is used to improve light transfer at the PMT/crystal interface, reduce spontaneous noise generations due to relative motion between the crystal and PMT, and to do so in a minimum amount of space.

During operation, high vibration or shock will cause the PMT/crystal subassembly to slide within the flexible sleeve.

This sliding friction provides effective damping. The coefficient of thermal expansion of the flexible sleeve is of little consequence in the radial direction since the flexible sleeve is only a few thousandths of an inch thick and deflects to allow thermal compliance.

Support of the PMT, radially inward of the hermetic tube or shield and flexible sleeve, is accomplished by placing it in a PMT housing that has the same diameter as the crystal reflector and/or SARCA. Between the PMT and its housing is a plurality of circumferentially spaced, radial springs or, preferably, another flexible sleeve to provide dynamic isolation for the PMT.

One critical aspect of support is to minimize bending of the PMT/crystal combination in order to prevent damage to the optical coupling between them, to prevent noise resulting from flexing the optical coupling, and to minimize bending modes in the assembly. This is also achieved by the polygon-shaped flexible metal support sleeve that engages the exterior of the PMT/crystal and the interior of the hermetic tube or shield, and that is relatively stiff even though it is made from thin metal.

Since the PMT requires high voltage for operation and since it outputs electrical pulses it is necessary to provide electrical connections between the PMT and electrical circuitry outside the hermetic tube or shield, but still inside the detector. This is accomplished by use of a special feed through. Tool space can be further saved by adding electronic components to the detector to avoid having additional housings available for that use. Described in one embodiment is a pre-amplifier assembly that is located within the detector assembly, though not inside the hermetic tube.

Outside the nuclear detector, a flexible dynamic housing including axially extending radial springs or another (i.e., outer) flexible metal support sleeve provides still another level of dynamic support for the total detector assembly and provides mechanical compliance so that the mechanical tolerances of the tool cavity, into which the detector is to be placed, do not have to be as stringent. Although movement of the detector is allowed by this outer flexible support sleeve, it only allows such movement within certain design parameters as will be described in detail later. Longitudinal positioning and restraint of the detector is accomplished with an elastomeric dome or end plug on each end of the detector, in combination with the outer flexible sleeve through sliding friction. The flexible dynamic housing may be constructed, as disclosed in pending application Ser. No. 10/028,430 filed Dec. 28, 2001, now U.S. Pat. No. 6,657,199, issued Dec. 2, 2003. Also, a dual flexible sleeve may be used. Various dynamic responses can be achieved through the detailed design of these support devices around the detector, as will be explained later.

Various end cap adapters are also disclosed herein for adapting the detector to different applications.

A detector package is also presented in which there is a standardized core assembly (comprising, e.g., a crystal and PMT and surrounding shield) that has been intentionally made slightly smaller in diameter than the typical diameters being used, as well as shorter in length than is typically required for a standard increment of crystal size. One or both of the end caps of the core assembly may have a standardized threaded hole, having a relatively large diameter, shallow depth and fine threads. Metallic wraps or metallic flexible sleeves are sized to allow adjusting the diameter of the core assembly to fit a wide range of tool cavity or housing sizes. Use of flexible sleeves allows providing for either a hard mounted configuration in order to maintain a dynamic transmissibility near unity for the expected vibration levels, or to provide for dynamic isolation at higher frequencies. Use of end adapters having a standardized, short, threaded stud that matches the shallow, large diameter, threaded hole on the core allows the length of the core assembly to be adjusted to fit a range of cavities sizes used in the application of use. End adapters also are provided with a selection of configurations in order to mate with various configurations in the mining machine, drilling tool, or other device into which the detector is being installed. Taken collectively, a few standardized core assemblies which contain detecting elements of a range of incremental sizes can be adapted to numerous configurations. Standardizing allows manufacture and stocking of standardized cores at lower cost for use by a wide range of users, simply by adding adapters as needed.

Accordingly, in one aspect, the invention relates to an instrumentation package comprising at least one substantially cylindrical instrumentation component; a substantially cylindrical shield surrounding the at least one instrumentation component, the shield having a diameter less than a standard predetermined diameter; and a sizing sleeve around the shield, thereby increasing the diameter of the sleeve to the standard predetermined diameter.

In another aspect, the invention relates to a nuclear detector package comprising a substantially cylindrical nuclear detection element; a substantially cylindrical shield surrounding the nuclear detection element, the shield having a diameter less than a standard predetermined diameter; and a sizing sleeve around the shield, thereby increasing the diameter of the sleeve to the standard predetermine diameter.

In still another aspect, the invention relates to a radiation detector comprising a substantially cylindrical crystal element; a photomultiplier tube arranged coaxially with the crystal element; an optical coupler sandwiched between one end of the crystal element and an adjacent end of the photomultiplier tube; the crystal element, optical coupler and photomultiplier tube hermetically sealed within a cylindrical shield; and a flexible support sleeve extending exteriorly along the crystal element and the photomultiplier tube and radially inside the cylindrical shield.

In still another aspect, the invention relates to a radiation detector comprising a substantially cylindrical crystal element; a photomultiplier tube arranged coaxially with the crystal element; an optical coupler sandwiched between one end of the crystal element and an adjacent end of the photomultiplier tube; the crystal element, optical coupler and photomultiplier tube hermetically sealed within a cylindrical shield; a non-hermetically sealed electronics housing adjacent the photomultipler tube for electrical components electrically connected to the photomultipler tube; wherein the photomultiplier tube is mounted within a PMT housing inside the cylindrical shield, with a flexible metal sleeve radially between the PMT housing and the shield.

The invention will now be described in detail with reference to the drawings identified below.

DETAILED DESCRIPTION OF THE INVENTION

With reference initially to FIGS. 1–5, a nuclear detector package 10 in accordance with an exemplary embodiment of the invention includes a hermetically sealed housing or shield 12 containing an instrumentation component, in this case a nuclear detection element in the form of a scintillation or crystal element 14, a reflector 16 surrounding the crystal element, a support sleeve 18 for supporting the crystal element within the shield, and a window 20 and optical coupler 21 through which light from the scintillation element passes to the outside (e.g., to a connected photomultiplier tube). Critical to reliable and noise-free performance in the harsh environments in solid mineral mining or oil well logging, is the support structure for the scintillation or crystal element 14. If not done properly, the crystal will move under high vibration or shock and may produce noise, break or otherwise fail. This is particularly true for MWD and LWD applications, but is also a consideration for wireline applications (Wireline, in the oil well logging industry, refers to the lowering instrumentation packages into a borehole and then making measurements of the formation and/or condition of the bore hole during removal).

Figures 2, 3, 4:
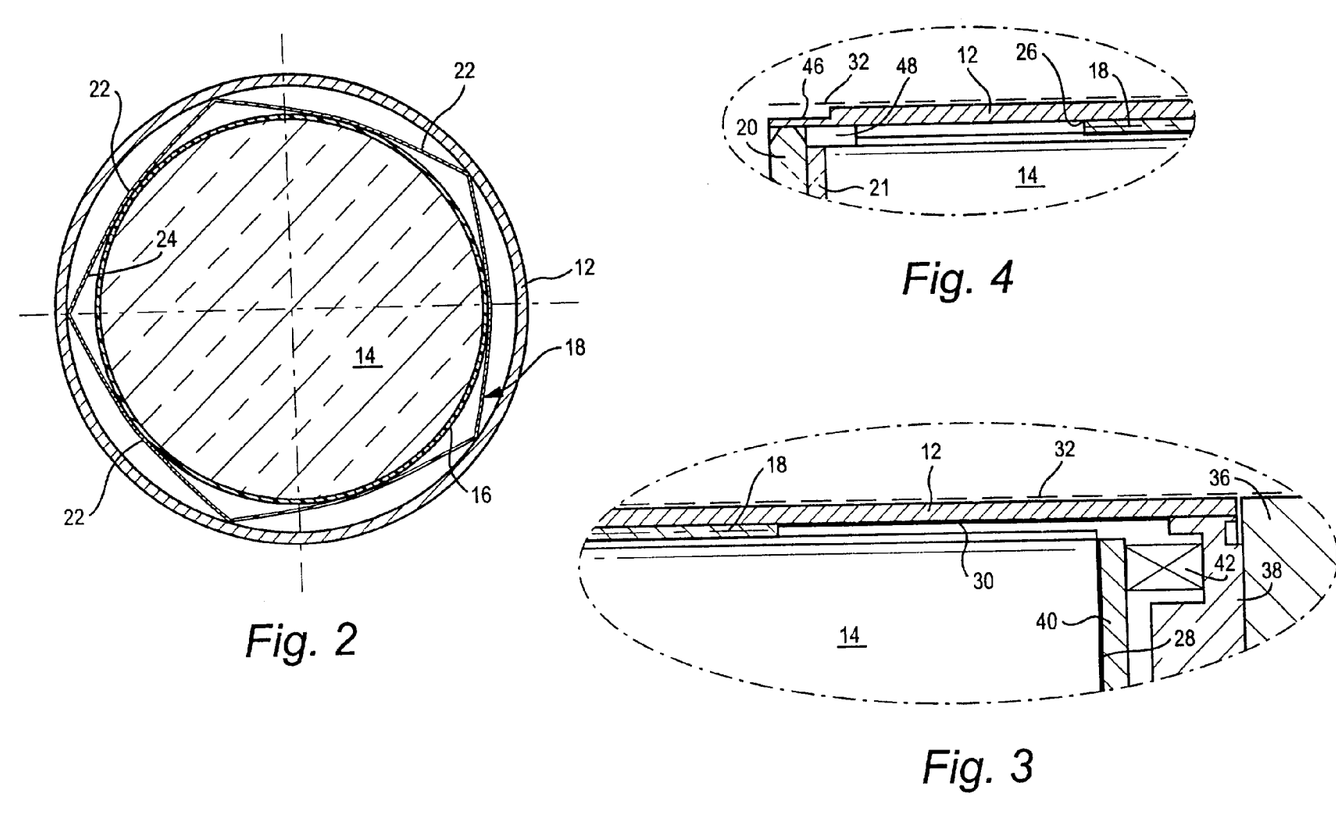
FIG. 2 is a cross section taken along the line 2—2 of FIG. 1.
FIG. 3 is an enlarged detail taken from FIG. 1.
FIG. 4 is an enlarged detail taken from FIG. 1.

In the exemplary embodiment, the dynamic support arrangement for the scintillation or crystal element 14 comprises a flexible support sleeve 18. Use of this support sleeve 18 also creates opportunities for other improvements. As best seen in FIG. 2, the flexible support sleeve 18 inside the shield 12 has a polygon shape in cross section. Specifically, the illustrated sleeve 18 is generally in the shape of a cylinder, but with five flat surfaces or flats 22. The dimensions are selected such that these flat surfaces 22, press against reflector material 16 (such as a conventional Teflon® tape) that is applied around the scintillation element 14. The thickness and type of material used to make the flexible sleeve 18 are selected in order to support the scintillation element 14 so as to achieve a minimum natural frequency. The sleeve 18 is preferably metal (e.g., stainless steel) but could be made of other appropriate material. The number of flats 22 may vary, combined with the knowledge of the space between the scintillation element 14 and the interior wall of the shield 12, determines the amount of preload on the surface of the scintillation element 14. A lubricating coating 24 (FIG. 2) on the interior surface of the flexible support sleeve 18, in combination with the preload force on the crystal element 14 determines the amount of axial restraint due to the friction between the flats 22 and the outer surface of the reflector material 16. The configuration of the flexible support sleeve 18 uses very little space, thus freeing up space for a larger crystal 14, if desired.

A small radial step 26 (see FIG. 4), only about 0.005" high, can be provided on an inner surface of the shield 12 so that the flexible support sleeve 18 will be stopped from sliding forward (toward the window 20). By making the flexible sleeve 18 shorter than the crystal 14, the flexible sleeve 18 will not extend over the crystal 14 in the front portion (near the optical coupler 21 of the crystal 14). Though such partial support may be less acceptable for the most extreme measurement while drilling applications, having the crystal 14 cantilevered inside the flexible sleeve 18 is feasible for solid mineral mining and wireline applications. In this fashion, there is no compression of the reflector tape 16 in the front portion of the crystal 14, thus reducing absorption of light. This radial step 26 also makes it practical to utilize a precision reamer tool to simply and cheaply complete the machining of the area to be brazed to the window 20.

Similarly, at the rear of the crystal 14, the reflector tape 16 around the crystal is not compressed, which improves reflectivity and helps light to press from the rear of the scintillation crystal 14 to the window 20 more effectively. Further, since the portion of the reflector tape 16 at the rear of the crystal 14 is not compressed, a thin reflective pad 28 at the rear of the crystal 14 can be simply constructed and installed by allowing the edges and/or corners of the pad 28 to overlap onto the cylindrical surface of the crystal 14. If the reflector tape in the end region of the crystal 14 were compressed, then the overlapping material from pad 28 would make the reflector tape 16 thicker in this region, causing it to be compressed even more. Even worse, the crystal 14 would likely expand toward the rear during high temperature operation, then get stuck in that position. As the crystal 14 cools down, the front end of the crystal would pull away from the coupler 21. This is a well known problem. The current invention allows the overlap which is desirable for higher performance and simpler and lower cost without the risk of the crystal 14 getting stuck at the rear. In order to restrain the flexible sleeve 18 against the step 26, a thin positioning sleeve 30 is installed at the rear of the flexible sleeve 14, between the back edge of the sleeve 18 and the end cap or back plate 38.

Since it is not practical to standardize the diameters and lengths and tolerances for all ruggedized crystal packages, even being undesirable in many instances, if cost reduction is to be achieved by standardization, it must be accomplished in another way. By making standard shields that are smaller in diameter, the diameter can then be increased by adding a sizing sleeve or metal wrap 32 that extends substantially the full length of the shield, and that has the required thickness to achieve the specified diameter to within a specified tolerance. By using this method, very precise diameters can be achieved, as is desired by some tool manufacturers, and can be done at a greatly reduced cost over trying to machine to satisfy the tolerances.

For example, if a 1.249 inch diameter stainless steel scintillation package is needed with a tolerance of ±0.001", the shield 12 would be turned at a smaller size, such as 1.240"±0.003". Once complete, if the diameter measures 1.243", a sizing sleeve 32 made from standard 0.0015" metal foil material can be applied, using a suitable bonding material. If the measured size of the raw shield is 1.237", then a sizing sleeve 32 made from 0.004" stainless steel would be bonded to the shield. Sizing rings (not shown), having an I.D. of 1.249" may be slipped over the top of the sizing sleeve 32. After the bonding material cures, the sizing rings would be removed. Other combinations of machined sizes, sheet material used for sizing sleeves, and bonding materials may be used, depending upon process preferences and cost considerations. For example, in order to have a much higher degree of standardization such that packages requiring slightly smaller finished package diameters need to be fabricated from the same standard raw shield size, the shields may be machined to a standard diameter of 1.235"±0.003". Starting with this standard shield 12, having a nominal 1.235" diameter, a finished diameter of 1.245"± can be achieved by use of a sizing sleeve 32 of 0.003". But starting with this same shield 12, the diameter can be precisely controlled to 1.249" by using 0.005" sizing sleeve material, applied with sizing rings, as described above.

It will be appreciated that other techniques are possible for precisely sizing the shield. For example, rather than a metal foil wrap bonded to the undersized shield, tape with a suitable adhesive backing, could be used to achieve the desired diameter. More significantly, a flexible metal sizing sleeve of polygon shape, similar to support sleeve 18, can be employed to allow the otherwise undersized shield fit precisely in a standard tool housing. By use of the flexible sizing sleeve, a full range of dynamic support options are created. A relatively stiff sleeve can be employed, using a relatively high frictional loading, so as to hold the detector fixed under most expected vibration conditions. Using the option, the detector will not resonate at the frequencies of the induced vibrations. A dual flexible sleeve may be used in order to provide a high degree of isolation without a significantly high resonance and still retain a high level of shock isolation. Another option is to use a sleeve of moderate stiffness and moderate frictional loading that produces dynamic isolation over higher frequencies and damped resonance in a frequency range where there is less concern.

Another important consideration for assuring low failure rates and lower cost for brazing sapphire windows onto thin sleeves is to ensure that the shield is round. Once shields are machined to standard smaller diameters, they can be held round by use of sizing collars, made from the same material as the shield 12, that are installed prior to brazing.

There is some standardization of crystal length for ruggedized scintillation packages. Typical lengths are in multiples of inches. For example, a 4" in length×1" in diameter size has been popular for many years. Diameters of scintillation crystals 14 and scintillation packages 10 typically vary by increments of ⅛ inch so that ⅞×4 and ¾×4 crystal sizes are also commonly used sizes. In recent years, there has been a trend to use smaller diameter, longer length crystals due to the limited space within tools or machines.

Figure 1:
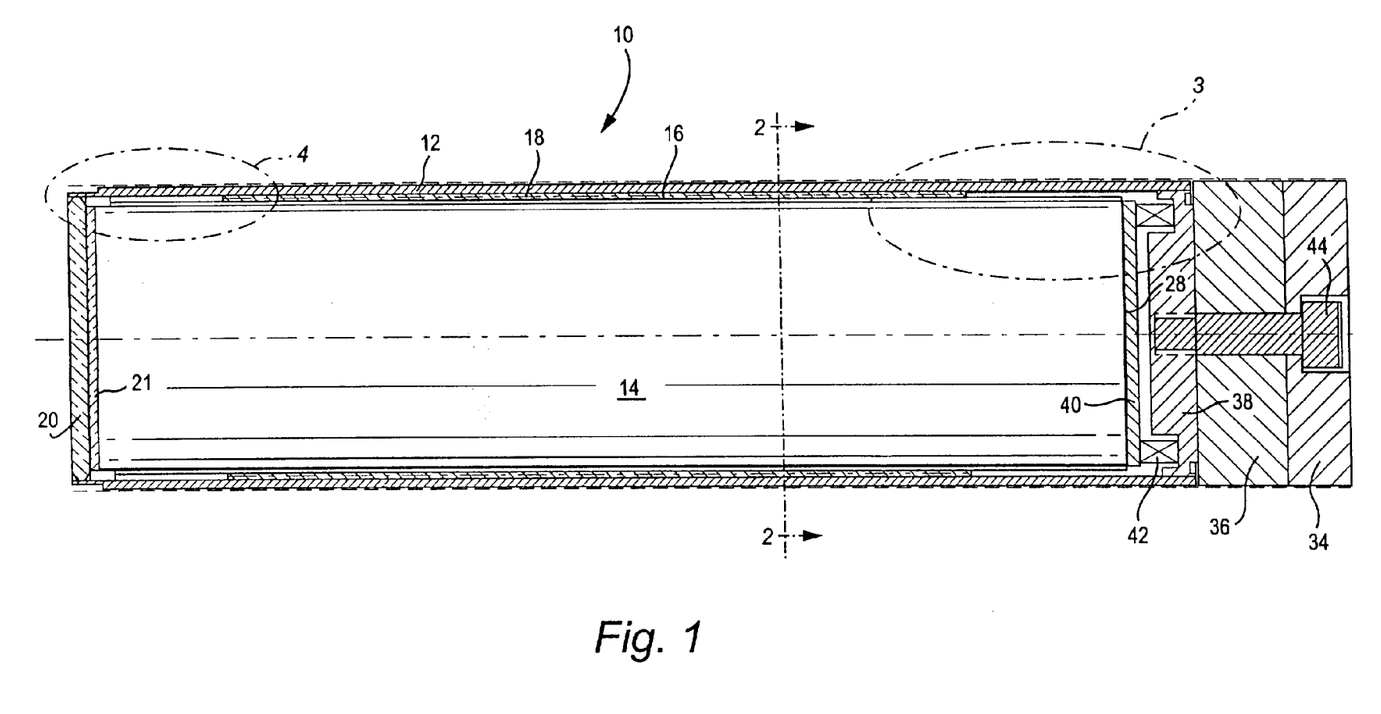
FIG. 1 is a side section of a scintillation package in accordance with the invention.

By choosing the shortest crystal package that is feasible for standard crystal sizes, an end cap adapter assembly with an extender section (or a removable spacer) allows a single package size to fit a range of cavities by simply changing the end cap or even better, by changing the size of spacer used on the end cap. Referring to FIGS. 1 and 3, an end cap adapter 34 with an extender section or spacer 36 work in concert with the end cap or back plate 38, and may vary the length of the package 10 over a typical range of 0.6 inches (obviously, the spacer 36 could be longer or shorter as needed. However, most packages containing a 4 inch long crystal will vary in length from 4.4 inches to 5 inches. In addition to varying the size of the spacer 36 to alter the effective length of the package, another option is to make the end cap spacer 36 from two or more smaller parts. Or, the spacer itself may also function as an end adapter. The end cap adapter 34 may also have whatever end fitting configuration required, such as, for example a threaded stud, threaded hole, boss or pin, spindle, etc., some of which are described further below. Crucial to this concept for standardization is a standardized interface on the end cap 38 and a matching interface on the end adapters (34 and/or 36).

As assembled, a compression plate 40 is located against the reflective pad 28 and an axial spring 42 is interposed between the compression plate 40 and the end cap or back plate 38. Note also that the shield 12 is welded about its back end to the periphery of the end cap 38. The positioning sleeve 30, located axially between the end cap 38 and flexible sleeve 12, is fitted with a nominal gap therebetween to allow for slight adjustment of the sleeve. An assembly screw 44 extends through the end cap adapter 34 and spacer 36 and is threaded into the back plate or end cap 38.

At the forward end of the package (see FIG. 4), a reduced diameter end portion 46 of the shield 12 is brazed to the window 20, with a silicone rubber (or other suitable material) spacer 48 located about the coupler 21 and axially between the window 20 and the reflective material or tape 16 wrapped about the crystal 14.

Coupling of the scintillation or crystal element 14 to the window 20 may be accomplished by molding or by bonding with a relatively thin coupling material made from optically transparent materials such as SYLGARD®, which has frequently been used for this purpose. Using a ringed pad in order to retain a coupling oil on its surface greatly improves the quality and durability of the optical coupling. This so-called oil-ringed coupler also helps to reduce mechanically induced noise. The thin optical coupler 21 is made more effective under high dynamic conditions through the use of the flexible support sleeve 18. The flexible support sleeve 18 provides positive restraint in the axial direction so that the scintillation element 14 does not easily move under high vibration, and provides a high natural frequency in the axial direction. If shock or vibration becomes high enough to cause the scintillation element or crystal 14 to slide within the flexible support sleeve 18, the sliding effectively dissipates energy through sliding friction which quickly dampens the motion. Yet, allowing the crystal 14 to slide some during high vibration or shock, or due to high temperature excursions prevents high forces from building up in the assembly. This is in contrast to relying on elastomers which tend to flex in the axial direction under low levels of vibration or shock, allowing the scintillation element 14 to resonant, thus further increasing the dynamic forces. This build up of resonance is damaging and/or produces noise in the output. Since the flexible support sleeve 18 is very rigid in the axial direction, the high natural frequency prevents dynamic coupling with externally induced vibration so that resonance is less likely to start. Then, if the levels of induced vibration or shock are high enough to cause the scintillation element to begin moving, it is quickly damped out by sliding friction, as explained earlier.

A gamma detector used in mining usually consists of a scintillation package (which produces flashes of light when struck by gamma rays) in combination with a light detecting device that converts the light flashes to electrical pulses. Most often, the scintillation element is a thallium activated sodium iodide crystal and the light detecting device is a photo-multiplier tube (PMT). When using hygroscopic crystals, such as sodium iodide, both components must be shielded from moisture, including moisture in air. Gamma detectors are typically constructed by enclosing the hygroscopic crystal in a hermetically sealed tube or shield which contains a window through which scintillation light pulses pass to the PMT. This window can be eliminated, however, by including the PMT inside the hermetic housing. Elimination of the window, as has been done in this preferred embodiment, improves the transfer of light from the crystal into the PMT.

Figure 5:
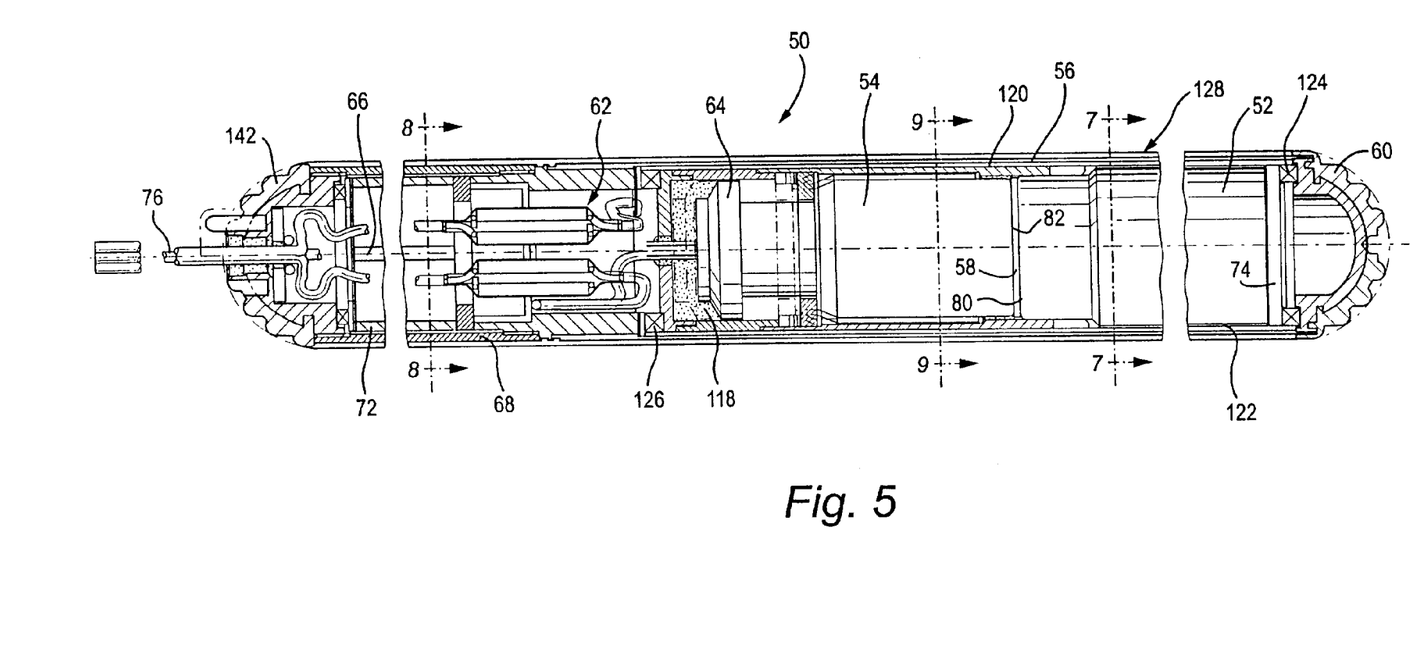
FIG. 5 is a side elevation, partly in section, of a highly integrated gamma detector in accordance with an exemplary embodiment of the invention.
Figure 6:
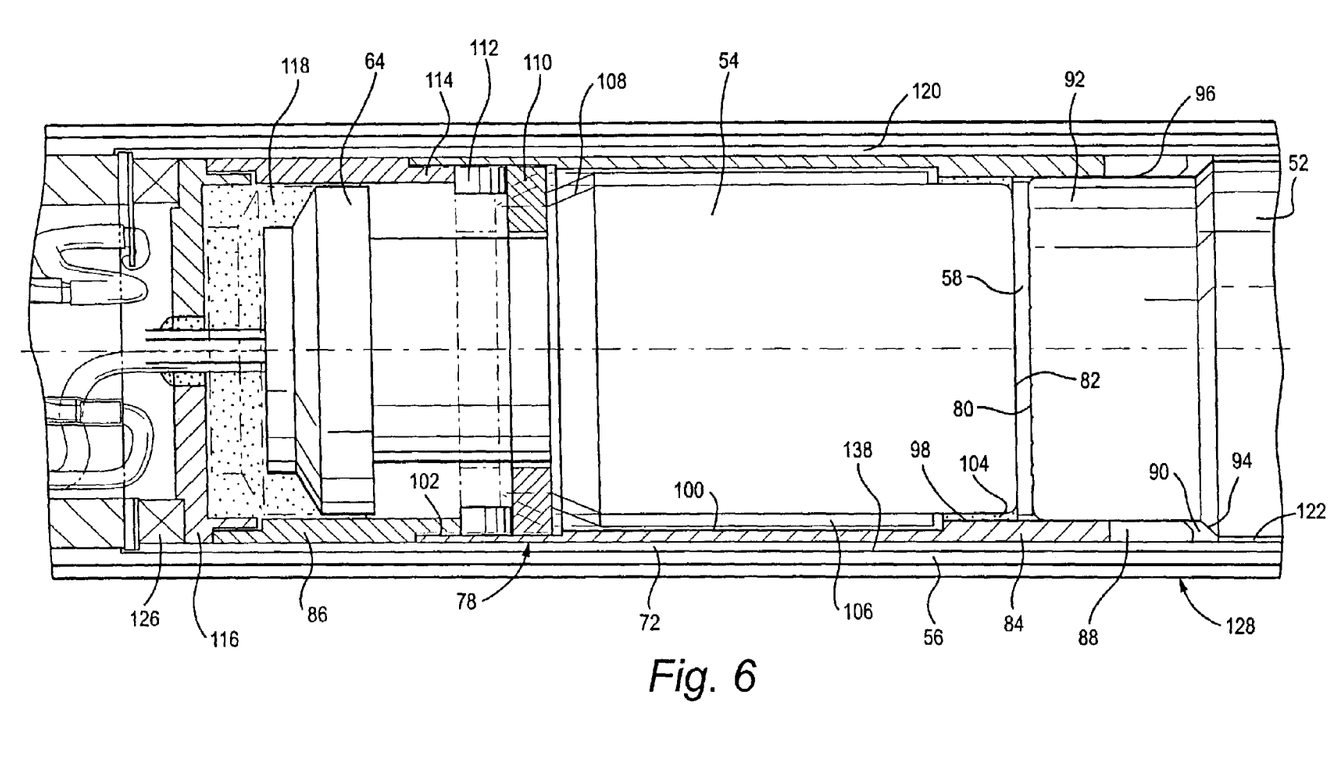
FIG. 6 is an enlargement of a center portion of FIG. 5.

With reference now to FIGS. 5 and 6, a radiation (e.g., gamma ray) detector 50 in accordance with an exemplary embodiment includes a scintillation element or crystal 52 and a photo-multiplier tube (PMT) 54 which are hermetically sealed within a tube or shield 56.

The crystal 52 and PMT 54 are directly coupled, with no window therebetween, by means of an optical coupler 58. Directly coupling the crystal 52 through the optical coupler 58 requires solving various engineering problems, particularly for a detector that is to be used in a harsh environment. Necessary actions include making special provisions for how the crystal 52 and the PMT 54 are supported within the tube or shield 56 and other important considerations.

Figure 8:
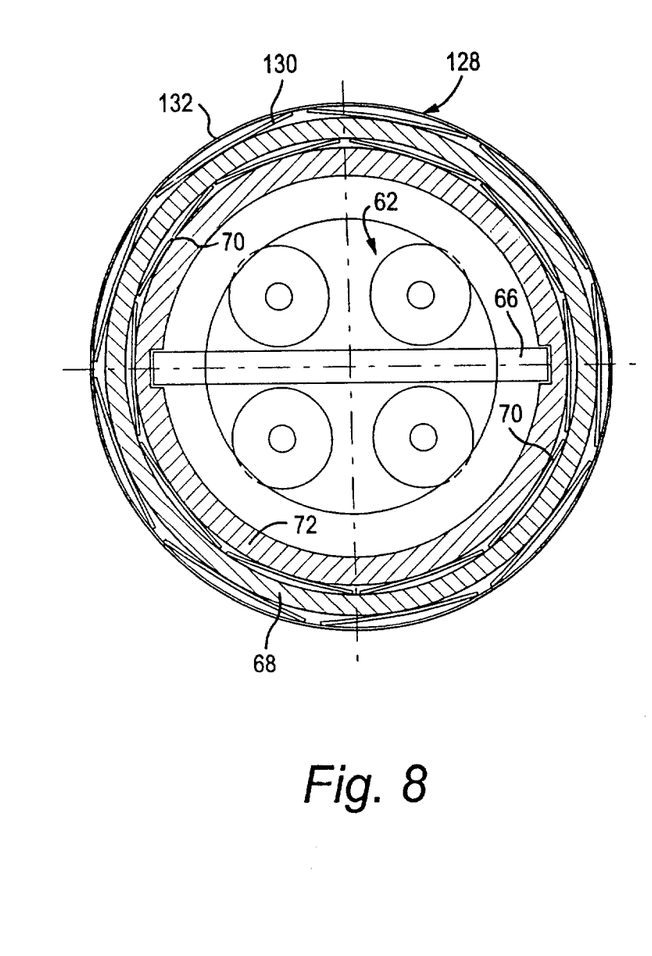
FIG. 8 is a section taken along the line 8—8 of FIG. 5.
Figure 9:
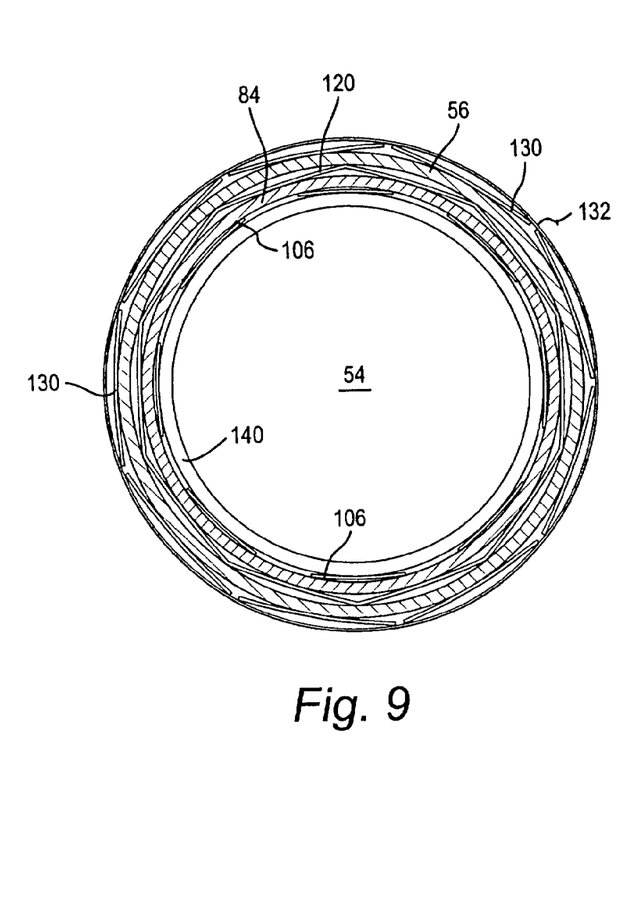
FIG. 9 is a section taken along the line 9—9 of FIG. 5.

In this exemplary embodiment, the crystal 52 is positioned in one end of the shield 56 with the PMT 54 and the optical coupler 58 at the other end. The end of the shield 56 in which the crystal 52 is placed is sealed with an end plug 60. The PMT end of the shield 56 is made hermetic by a feedthrough 62. An electrical divider string 64, shown in FIGS. 5 and 6, necessary for the PMT 54 to function, is included in the hermetically sealed portion of the shield 56. Electrical power to the divider string 64 and the signals from the PMT 54 are passed through the hermetically sealed feedthrough 62. In this particular embodiment, a preamplifier assembly 66 is included in the electronics housing portion 68 of the detector 50 that is not hermetically sealed. The preamplifier assembly 66 may be supported by axially extending radial springs 70 (see FIG. 8) between it and the housing 68, or, alternatively, by a flexible support sleeve. Other electronic components located in the housing portion 68 may include a PC board mount 72, a power supply, digital processing electronics, or other electrical components that may be of a conventional nature, with exit wires 76 extending out of the detector.

When a gamma ray produces a scintillation flash in the crystal 52, light emanates from the point of scintillation in all directions. Efficient operation of the detector 50 requires that the light produced by the scintillation element or crystal 52 that goes in directions other than toward the PMT 54 must be reflected toward the PMT. In this embodiment, the reflector consists of reflective TEFLON® tape that has been wrapped around the cylindrical portion of the crystal 52 and a reflective disk 74 on the end of the crystal 52 remote from the PMT 54. This disk 74 may be constructed from various materials, including alumina. An alternative to the disk 74 is a pad made from multiple layers of the reflective tape material used around the cylindrical portion of the crystal 52. The amount of reflection from certain areas of the crystal 52 is increased by changing the features on the surface of the crystal. For example, it is common practice to sand or scratch the crystal surfaces in regions away from the PMT 54 to improve the diffuse reflection of light toward the PMT.

Efficient transfer of light from the crystal 52 to the PMT 54 requires the optical coupler device 58, shown here as an oil-ringed coupler filled with optical coupling fluid, preferably a silicon oil. This coupler 58 is preferably a Sylgard® pad capable of carrying substantial axial loading, and has been molded onto the face plate 82 of the PMT 54 and, when feasible, onto the PMT housing 78 that surrounds the PMT. Another method for coupling is to bond the end 80 of the crystal 52 to the faceplate 82 of the PMT 54. Another method for coupling may be an oil-ringed coupler having oil retaining rings on both surfaces of the coupler 58.

When noise-free operation is required under extreme vibration conditions, such as certain MWD operations where vibration levels may reach 40 G rms, additional support provisions are required. In this embodiment, the PMT 54 is enclosed within the PMT housing 78, including a front portion 84 and a rear portion 86. The front portion 84 extends beyond the PMT 54, overlapping the optical coupling interface between the PMT 54 and the crystal 52. The remote end of the front portion 84 is formed with circumferentially spaced slots 88, while an annular gap 90 lies forward of the slotted end of the front portion 84. In other words, the front portion 84 of the PMT housing is slidably received over a reduced diameter portion 92 of the crystal 52, with the gap 90 axially between the PMT housing and a tapered shoulder 94 on the crystal 52. A metallic band 96 coated with a lubricating reflective material or other suitable reflective, low friction material, is located on the reduced diameter portion 92 of the crystal for reasons provided further herein.

The front portion 84 of the PMT housing 78 is formed with progressively increasing diameters from a first inner diameter at 98 to a second inner diameter at 100 and a third inner diameter at 102. The first inner diameter 98 is sized to create a radial space between the PMT 54 and the housing 78 that is filled with a silicon-based rubber material 104 known as RTV. This material prevents leakage of Sylgard® while being molded onto the face of the PMT 54.

The second inner diameter 100 is sized to permit the insertion of axially extending, circumferentially spaced radial strip springs 106 (typically stainless steel) radially between the PMT 54 and the PMT housing 78. These springs 106 extend along a major portion of the length of the PMT, terminating at a tapered shoulder 108 at the rear end of the PMT 54. For a one inch diameter detector, the springs may be about 0.005 inches thick and 0.37 inches wide. Other sizes may be selected to alter the resonant frequency and other properties thereof. The PMT springs 106 may be replaced by another flexible, polygon-shaped sleeve, similar to the sleeve 120 described further herein.

The third inner diameter 102 is sized to permit insertion of a split ring 110 and a plurality of annular shims or spacers 112 that prevent slide-back of the PMT. This arrangement also provides the capability for using PMT's of different length, i.e., shims may be removed or added as required to accommodate a PMT of increased or decreased length (indicated in phantom in FIGS. 1 and 2).

The rear portion 86 of the PMT housing has a reduced diameter end 114 that is telescopically received within the front portion 84 of the housing 78. The opposite end of the rear portion 86 is counterbored to receive an end cap 116. RTV material 118 partially fills the space between the end cap 116 and the divider string 64.

Figure 7:
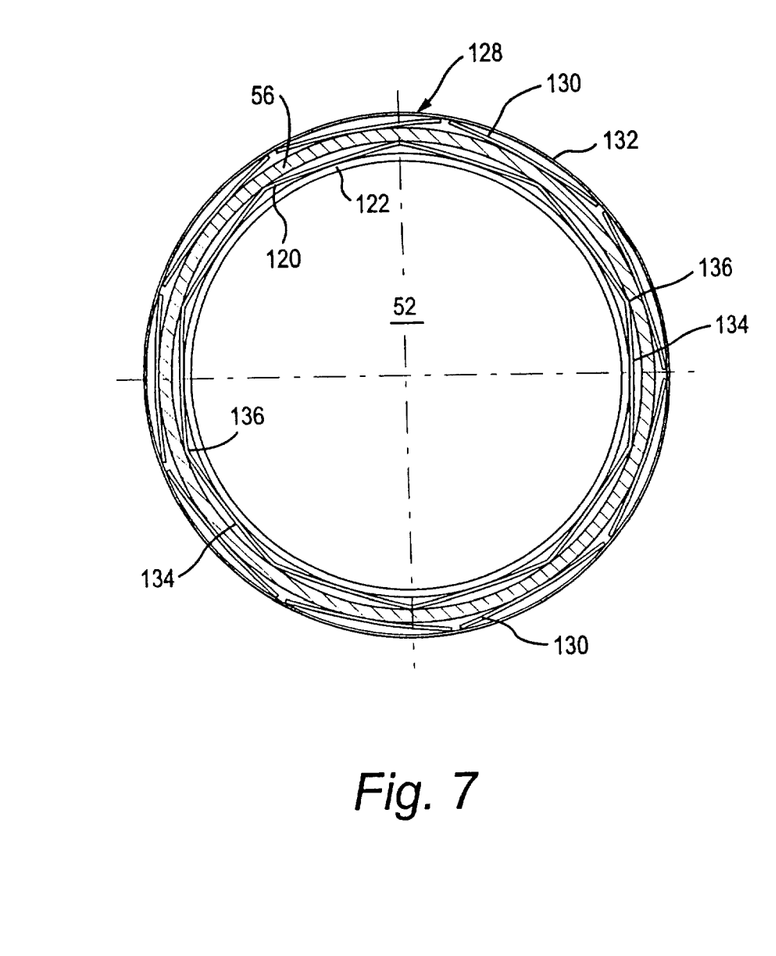
FIG. 7 is a section taken along the line 7—7 of FIG. 5.

One critical need for supporting the fragile crystal 52, often made from materials such as sodium iodide which is easily broken, and the PMT 54 is to prevent bending of the assembly, particularly in the area around the optical coupler 58. If bending is allowed, light pulses will often be generated under high vibration due to movement of the materials. If the interface consists of bonding the PMT 54 together with the crystal 52, using a transparent coupling material, for example, the coupler 58, this bond may actually be broken. Unfortunately, these problems exist for even very small amounts of bending resulting from little relative motion of the crystal 52 relative to the PMT 54. Bending is prevented by installing a thin, polygon-shaped, flexible support sleeve 120 around the PMT/crystal assembly. This sleeve is preferably metallic but could be made from other high strength materials that exhibit spring characteristics. Referring again to FIG. 5, the flexible support sleeve 120 is located radially inside the hermetic tube or shield 56, and surrounds the crystal 52. This flexible support sleeve 120 (see also FIGS. 6 and 7) has a polygon-shaped cross-section and is relatively stiff even though the metal is thin (in the range of from 0.002" to 0.005"). In the embodiment shown, the flexible sleeve 120 has 10 flat sides, each of which has a width of about 0.28 inches. Each flat side or surface 134 engages the outside surface of a radial and axial support assembly 122 that surrounds the crystal, and the outside surface of the PMT housing 78. Corners 136 defined by the flat surfaces 134 engage the inner surface of the hermetic tube or shield 56. As a result, the flexible support sleeve 120 is effective for minimizing bending between the PMT 54 and crystal 52. The diameter of the PMT housing 78 around the PMT 54 and the crystal 52 (including supporting materials discussed further below) are made to be substantially the same so as to produce contact along substantially the full length of the flexible support sleeve 120.

The crystal 52 is wrapped with a TEFLON® or other suitable reflective tape (the outer surface of the tape may have a polyamid layer thereon). The crystal is supported by the radial and axial support assembly 122. The support assembly may comprise a sidewall axial restraint and compliance assembly, or SARCA, of the type disclosed in U.S. Pat. No. 5,962,855. The SARCA generally includes an inner polyamide sleeve and an outer stainless steel sleeve or wrap, the interfacing outer surface of which may be coated with Teflon®. Note that the SARCA is axially shorter than the crystal at one end thereof closest to the optical coupler 58 that is located between the crystal 52 and the PMT 54, such that it does not limit any axial movement of the PMT housing 78. Similarly, length of the flexible sleeve is less than the combined length of the PMT/crystal assembly for the same reason.

The support assembly 122 may, in an alternative arrangement, include annular support rings over the top of the reflective Teflon® tape, with additional layers between the rings. The first mentioned SARCA support assembly is especially useful in MWD operations, while the second mentioned support assembly is especially useful in Wireline arrangements. It will be understood that the SARCA arrangement may also be employed in the package shown in FIG. 1, located radially inward of the flexible support sleeve 18.

The crystal end of the hermetic tube 56 is closed by the end cap or plug 60 with an axial spring 124 interposed between the end plug and the reflective disk 74 on the back end of the crystal. The PMT end of the hermetic tube 56 is sealed by the feedthrough 62, with axial spring 126 interposed between the feedthrough and the end cap 116. Thus, springs 124 and 126 bias the PMT 54 and crystal 52 toward each other, maintaining compressive engagement at the coupler 58. The axial forces generated by springs 124, 126 are determined by the sizing of the springs, differential thermal expansion and dynamic forces. The forces required by these springs 124, 126 are greatly reduced by the use of the flexible sleeve 120. The flexible sleeve provides a specified axial restraint that increases at a predictable rate that is much less than would be produced by a non-linear elastomeric support.

Surrounding the hermetic tube or shield 56 is another radial support assembly, herein referred to as a flexible dynamic housing 128 that may include a plurality of axially extending metal springs 130 within a thin, outer flexible metal sleeve 132. The sleeve 132 may be constructed by rolling a sheet of stainless steel 0.0015 inches thick to produce two complete layers, bonded with high temperature adhesive. In an alternative arrangement, the springs 130 may be replaced with an outer flexible metal support sleeve of polygon cross-section, similar to sleeve 120. The flexible dynamic housing (including springs 130 or outer flexible sleeve) extends the full length of the detector, extending between end plug 60 at the crystal end of the detector and end plug 142 at the opposite end thereof.

As already mentioned, the outer surfaces of the cylindrically shaped support assembly 122 and the outer surfaces of the PMT housing 78 are in contact with the flat portions 134 of the flexible support sleeve 120, while the corners 136 of the flexible sleeve 120 are in contact with the inner surface 138 of the hermetic tube 56. Whenever external forces are applied to the tube 56 so that it begins to accelerate in the direction of the applied force, the inertia of the crystal 52 will result in the flexible support sleeve 120 moving relative to the crystal 52 so that a force is applied to the flexible support sleeve 120 at the flat surfaces 134 and corners 136 of the sleeve. The flexible support sleeve 120 will begin to bend around the points of contact and will increase force against the crystal 52 and thereby accelerate the crystal.

The amount that the flexible support sleeve 120 bends and the rate that the crystal 52 is accelerated is dependent upon the force being applied and the stiffness of the flexible sleeve. As the flexible sleeve 120 is bent by the force being applied to it, the result is that the corners 136 must slide on the inner surface 138 of the tube 56 into which it is installed. Also, the crystal 52 must slide relative to the flat surfaces 134 of the flexible support sleeve 120 in order to move relative to it. The configuration of the flexible support sleeve 120 is such that the contact pressure increases as the deflection increases so that the friction component is proportional to the radial movement. Both of these actions, sliding of the support sleeve 120 relative to the tube or shield 56 into which it is installed and sliding of the detector 50 (i.e., the PMT/crystal) relative to the support sleeve 120, produces very beneficial damping due to the sliding friction. This is in contrast to spring means such as elastomers which typically do not slide much relative to the other surfaces but deform. The damping from deforming such materials is limited to the internal losses of the materials as they are distorted. Such internal losses are not as effective for producing damping as a design having sliding friction, such as a flexible sleeve. A high level of damping is extremely beneficial because it minimizes the response to high levels of vibration and shock.

Thermal expansion is a critical parameter in the design of a nuclear detector being used downhole because the temperature often is as high as 175 Degrees Centigrade and may even be as high as 200 Degrees Centigrade. As the PMT housing portions 84, 86 expand, relative to the glass envelope 140 of the PMT (see FIG. 5), the PMT springs 106 (or suitable flexible sleeve) relax but stay in contact with the PMT housing portions 84, 86 and the PMT 54. As the PMT housing portions 84, 86 typically made from poly-ethyl-ethyl-ketone (PEEK), expand outward, it is at approximately the same rate as the crystal element 52 expands. This expansion of the housing portions 84, 86 and the crystal 52 is accommodated by the flexible support sleeve 120. As the support sleeve 120 is compressed, the force from it on the housing portions 84, 86 and the crystal 52 increases but at a constant and predictable rate. Being metallic, the stiffness of the flexible support sleeve 120 does not change significantly as a result of being loaded by the expansion of the items being supported so that the natural frequency of the supported element does not change by a significant amount. A temperature increase from room temperature to 175 degrees Centigrade produces a relative expansion of about 0.0046 inches. Given the spring properties of the flexible metal support sleeve 120, the amount of expansion of the PMT housing portions 84, 86 and the crystal 52 is relatively small.

During operation, vibration and shock in the radial direction will also result in the flexible sleeve 120 being deflected. Ideally, the support sleeve 120 would be deflected equally at the PMT 54 and at the crystal 52. However, since the mass density of the two are different, there will be a small difference. For measurement while drilling (MWD) applications, this difference, may, at times, cause enough relative motion at the coupler 58 between the PMT 54 and the crystal 52. Whenever the coupler 58 is molded to the faceplate 82 of the PMT 54, as in this embodiment, the relative motion will occur within the optical coupler 58 but most of the relative motion will occur at the interface between the optical coupler 58 and the face end 80 of the crystal 52. Fortunately, the oil on the surface of the oil-ring coupler will allow some free relative motion without producing flashes of light which would be interpreted by the PMT 54 as a scintillation, giving a false reading. Also, small relative motions will not cause a loss of oil from between the rings on the coupler 58. However, under the most severe conditions, the relative motions may be detrimental to the operation of the optical coupler 58. To prevent this from happening, portion 92 of the PMT housing has been extended beyond the face of the crystal 52 in order to capture the end of the crystal 52. As already noted, if the diameter of a crystal 52 is larger than the diameter of the PMT, as shown in FIG. 1, the diameter of the front end of the crystal 52 is reduced to allow the PMT housing 78 to extend over the reduced diameter portion 92. High reflectivity is retained for this portion of the crystal 52 by placing the metallic band 96 around the reduced diameter portion 92 of the crystal 52, i.e., in the region that is captured by the PMT housing 78. This band is coated with a suitable white, reflective coating, such as a combination of alumina and boron nitride. Such a coating is also a lubricant so that the crystal 52 is free to slide within the housing 78. A layer of reflective Teflon® tape may also be used in place of this band. The lubrication on the band is important to prevent the crystal 52 from getting stuck, during thermal cycling, in a position slightly away from the coupler 58 such that oil might escape. Thus, the arrangement provides a "slip joint" that allows the PMT 54 and crystal 52 to move relative to each other in an axial direction but restrains motion in the radial direction. This may occur when the optical coupler 58 expands with temperature and pushes the crystal 52 away but then contracts with lowering temperature. Given the relatively linear stiffness of the flexible sleeve, the radial compressive forces are kept sufficiently low.

In instances where the diameter of the PMT 54 is nearly as large as the crystal 52, there is no space for the added support of the PMT. In that case, the PMT may be sized to be in direct contact with the flexible support sleeve 120. This may be accomplished by wrapping the PMT with a sheet of thin, strong material, such as stainless steel. In order to provide the support of the crystal at the PMT/crystal interface, the wrap may be extended over the front of the crystal.

Thus, the incorporation of flexible support sleeve 120 and other construction features described herein provide uniform support, dynamic isolation and axial restraint for the PMT/crystal assembly within the detector 50, all in a predictable and controlled manner.

Figure 10:
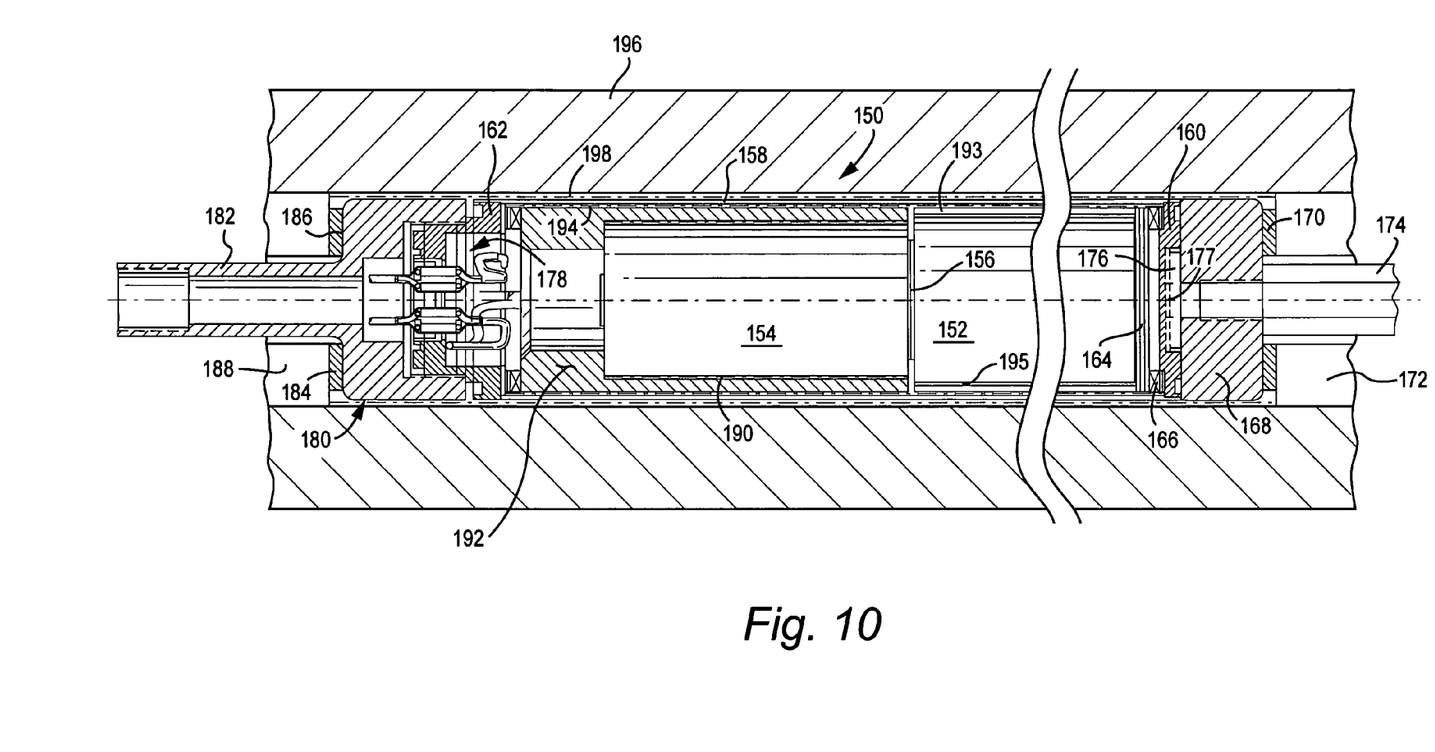
FIG. 10 is a partial section of a detector assembly located within a tool housing in accordance with another embodiment of the invention.

FIG. 10 represents another highly integrated detector construction in accordance with the invention, located within an external tool housing. Specifically, the detector 150 includes a scintillation or crystal element 152 axially coupled to a PMT 154 via an optical coupler 156 (preferably with oil filled rings). The crystal and PMT are hermetically sealed within a tube or shield 158 that is welded at opposite ends, i.e., to an end cap or back plate 160 at the back of the crystal 152 and a front plate 162 at a forward end of the PMT 154.

A compression plate 164 and axial spring 166 are located axially between the standardized back plate or end cap 160 and the crystal. An end cap adapter or spacer 168 is located behind the end cap 160, with a spring 170 between the end cap adapter 168 and an adjoining tool element 172. An end adapter spindle 174 is secured to the end cap 160, through the spacer 168, by means of a threaded stud 176 threadably secured to the shallow, relatively large diameter threaded socket 177 in the end cap. Note that the flat surface of the end cap 164 provides a matching interface for the spacer 168. Other matching surface configurations may also be employed.

At the forward end of the assembly, the forward end plate 162 encloses electrical connectors 178 that project out of the assembly, but that are further enclosed within another end cap adapter 180 that includes a centrally arranged tubular extension or spindle 182 that guides and maintains lead wires (not shown) attached to the connectors 178. An annular spring 184 is located against a shoulder 186 of the end cap adapter 180, sandwiched between the latter and another adjoining tool 188. A first flexible support sleeve 190 is located radially between the PMT 154 and a PMT housing 192. A second flexible support sleeve 194 is located radially inside the tube or shield 158, extending along the PMT housing 192 and a radial spacer 193 for the crystal 152. It will be understood that the crystal 152 may be wrapped with a reflective tape as previously described by a SARCA 195. This entire assembly is located in a cylindrical tool housing 196, with a third outer flexible support sleeve 198 radially interposed between the hermetic tube or shield 158 and the tool housing 196. It will be appreciated that the flexible support sleeves 190, 194 and 198 are preferably metal and are also polygon-shaped in cross section.

It will be appreciated that flexible sleeves like sleeves 190, 194 and 198 may also be used in connection with other radiation detector configurations, as well as other, different kinds of instrumentation packages, to provide radial and axial support for the instrumentation components.

Figure 11:
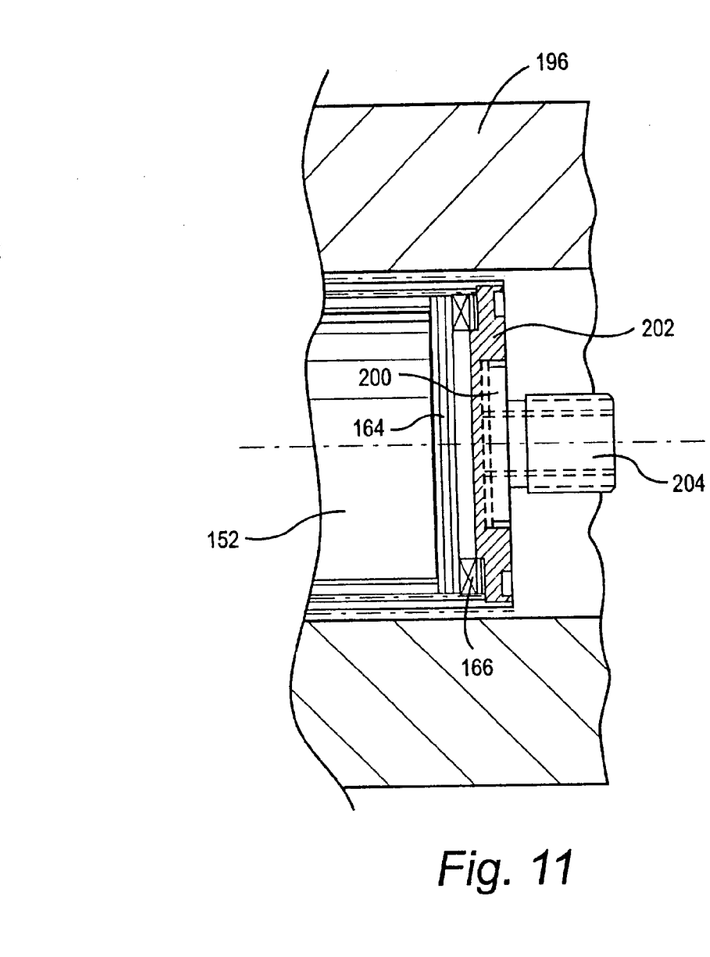
FIG. 11 is a partial section illustrating a variation in an end adapter in accordance with the invention.

FIG. 11 illustrates yet another adapter arrangement including a standardized end cap 202 and threaded stud 200. In this arrangement, the extended spindle has been removed in favor of an axially shorter tip 204 that allows incorporation of a radiation calibration source without otherwise changing the design of the adapter.

It will be appreciated that the standardized end caps may be provided with various interfaces for securing matched adapters to meet specific requirements.

Flexible support sleeves as described herein can be used in combinations so as to optimize protection for various elements within an instrumentation package, such as a nuclear detector. The PMT must be supported, the PMT/crystal has a combined support, and the complete detector must be supported. When operating within an extreme vibration environment, possibly as high as 40 G rms or with frequent shocks above 200 Gs, it may be important to provide different protections for elements within the package, by use of multiple flexible sleeves. Consider, for example, a scintillation detector of the type shown in FIG. 5. If this configuration were selected for use in a 40 G rms vibration and high temperature environment at 175 Deg. C., protection requirements for the crystal assembly may differ from that for the PMT or the PMT/crystal combination. In order to prevent mechanical motion from generating optical flashes at the interface, or at the crystal surfaces, the relative motion of the PMT and crystal must be kept very small. To achieve small relative motion, the flexible support sleeve 120 that surrounds the crystal and the PMT must be relatively stiff, with a resonant frequency set at 500 Hertz or above, or the preload would be set so as to keep the PMT and crystal locked in position under vibration but releasing under high shock. If a second flexible support sleeve is used around the PMT (in place of individual springs 106), it would likewise typically be relatively stiff with a resonant frequency about 1000 Hertz. Given these two choices made, a decision would be made as to whether the outer flexible support sleeve would be configured to have a transmissibility of near unity over the expected frequency range or to have a moderately damped resonance at some frequency that would provide dynamic isolation for higher frequencies. One factor would be the expected power spectral density over the range of frequencies expected to be induced by the environment and the other would be the sensitivity of the PMT to high frequency. If a PMT is expected to be easily affected or damaged by the higher frequencies, isolation might be chosen. A resonant frequency around 700 Hertz would be chosen and preload would be selected to provide suitable damping at the maximum vibration level, chosen here as 40 G rms. The amount of damping and the amount of isolation desired at the sensitive frequency would be selected for optimum results. If, on the other hand, the induced vibrations are not expected to have much energy at the higher frequencies or the PMT is not especially sensitive to higher frequencies, the flexible support sleeve 120 around the detector would be sized to provide adequate stiffness and preload to keep the detector from moving, similar to being hard mounted, for the 40 G rms. Another example would be when operating in an environment in which most of the incoming vibration energy is below some frequency, such as 400 Hertz, and the PMT being used is relatively insensitive to the lower frequencies. The flexible sleeve around the detector would typically be sized to have a natural frequency at least 1.4 times the maximum frequency, or 560 Hertz. By using this approach, the installation forces can be kept low since the approach is to separate the natural frequency from the induced frequencies rather than to hold the detector fixed through friction. Another example would be the use of a detector configuration similar to that shown in FIG. 10 which is to be used in a wireline application. Under vibration, the crystal and PMT would be held fixed by the friction of the flexible support sleeve 194 within the shield 158 for the moderately harsh vibration wireline environment and the entire detector would also be held fixed by friction with another, outer flexible support sleeve 198 around the detector. Under shock, the outer sleeve would be the first to break friction to allow shock isolation, followed by the inner sleeve allowing movement for shock isolation. As can be seen from these example, flexible support sleeves can be configured to be used in combination to optimized dynamic support designs for a wide range of combined vibration, shock, and high temperature environments for a variety of sensitive instrumentation elements.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A radiation detector comprising:
   a substantially cylindrical crystal element;
   a photomultiplier tube arranged coaxially with said crystal element;
   an optical coupler sandwiched between one end of said crystal element and an adjacent end of said photomultiplier tube;
   said crystal element, optical coupler and photomultiplier tube hermetically sealed within a cylindrical shield; and
   a flexible support sleeve extending exteriorly along said crystal element and said photomultiplier tube and radially inside said cylindrical shield, wherein said flexible support sleeve comprises a flexible metal sleeve having a polygon shape in cross section.

2. The radiation detector of claim 1 and including a stainless steel wrap about said crystal element, radially inward of said flexible support sleeve.

3. The radiation detector of claim 2 and further comprising a radial spacer between said stainless steel wrap and said flexible support sleeve.

4. The radiation detector of claim 1 and further comprising a radial spacer between said crystal element and said flexible support sleeve.

5. The radiation detector of claim 4 wherein said radial spacer is constructed of polyethylethylhetone.

6. The radiation detector of claim 1 wherein said crystal element is wrapped with reflective tape and wherein internal surfaces of said flexible metal sleeve engage said reflective tape along narrow lines of contact.

7. The radiation detector of claim 1 wherein said flexible metal sleeve has a thickness in the range of from 0.002 to 0.005 inches.

8. The radiation detector of claim 1 wherein a reflective disk is located at an opposite end of said crystal element and wherein said cylindrical shield is closed by an end cap, with an axial spring interposed between the end cap and the reflective disk.

9. The radiation detector of claim 1 and further comprising a sizing sleeve around said shield to thereby increase the diameter of said shield to a predetermined diameter.

10. The radiation detector of claim 9 wherein said sizing sleeve comprises metal foil bonded to said shield.

11. The radiation detector of claim 1 wherein said sizing sleeve comprises adhesively backed tape.

12. The radiation detector of claim 1 wherein said sizing sleeve comprises a flexible metal sleeve having a polygon shape in cross-section.

13. The radiation detector of claim 1 wherein said sizing sleeve and said flexible support sleeve are constructed of stainless steel.

14. The radiation detector of claim 1 wherein one end of said shield is closed by an end cap having a standardized interface for attachment to an end cap adapter.

15. The radiation detector of claim 14 including spacer means for effectively increasing a length dimension of said end adapter to thereby allow said package to fit within tool housings otherwise too long for said substantially cylindrical instrumentation component.

16. The radiation detector of claim 1 and further comprising a tool housing, said radiation detector located in said tool housing with an outer flexible metal support sleeve located radially between said radiation detector and said tool housing.

17. The radiation detector of claim 16 wherein said outer flexible metal support sleeve is polygon shaped in cross section.

18. The radiation detector of claim 17 wherein said outer flexible metal support sleeve is comprised of stainless steel.

19. The radiation detector of claim 1 wherein said optical coupler comprises an oil-ringed optical coupler.

20. The radiation detector of claim 19 wherein said oil-ringed coupler is bonded to said photomultipler tube.

21. The radiation detector of claim 19 wherein said oil-ringed coupler is molded to said photomultipler tube.

22. A radiation detector comprising:
a substantially cylindrical crystal element;
a photomultiplier tube arranged coaxially with said crystal element;
an optical coupler sandwiched between one end of said crystal element and an adjacent end of said photomultiplier tube;
said crystal element, optical coupler and photomultiplier tube forming an assembly hermetically sealed within a cylindrical shield;
a non-hermetically sealed electronics housing adjacent said photomultiplier tube for electrical components electrically connected to said photomultiplier tube;
wherein said photomultiplier tube is mounted within a PMT housing inside said cylindrical shield, with a first flexible metal sleeve having a polygon shape in cross-section located radially between said photomultipler tube and said PMT housing.

23. The radiation detector of claim 22 wherein one end of said PMT housing extends beyond said photomultiplier tube and overlaps a portion of the crystal element.

24. The radiation detector of claim 23 wherein said opposite end of said PMT housing extends beyond said photomultiplier tube and abuts an end cap.

25. The radiation detector of claim 24 wherein one or more spacers are located axially between said photomultiplier tube and said end cap radially inward of said opposite end of said PMT housing.

26. The radiation detector of claim 22 and including a second flexible metal sleeve having a polygon shape in cross-section located radially between said assembly and said shield.

27. The radiation detector of claim 26 and further comprising an outer flexible dynamic housing surrounding said shield, and a plurality of axially extending metal springs radially between said shield and said flexible dynamic housing.

28. The radiation detector of claim 26 and further comprising an outer flexible dynamic housing surrounding said shield, and a third flexible metal sleeve having a polygon shape in cross-section located radially between said outer flexible dynamic housing and said shield.

* * * * *